United States Patent [19]

Katamine

[11] Patent Number: 4,760,738

[45] Date of Patent: Aug. 2, 1988

[54] CONTACT MEDIUM FOR USE IN PROBE OF ULTRASONIC FLAW DETECTOR

[75] Inventor: Akihiko Katamine, Yokohama, Japan

[73] Assignee: Kabushiki Kaisha Komatsu Seisakusho, Tokyo, Japan

[21] Appl. No.: 883,220

[22] Filed: Jul. 8, 1986

[51] Int. Cl.[4] .............................................. G01H 11/08

[52] U.S. Cl. ....................................... 73/644; 310/336

[58] Field of Search .................. 73/644; 310/334, 336, 310/800; 367/152

[56] References Cited

U.S. PATENT DOCUMENTS

| | | | |
|---|---|---|---|
| 3,663,842 | 5/1972 | Miller | 73/644 |
| 4,399,526 | 8/1983 | Eynck | 367/152 |
| 4,446,395 | 5/1984 | Hadjicostis | 310/334 |
| 4,523,122 | 6/1985 | Tone et al. | 310/334 |
| 4,628,223 | 12/1986 | Takeuchi et al. | 310/334 |

FOREIGN PATENT DOCUMENTS 55-55248 4/1980 Japan .

*Primary Examiner*—John Chapman

*Attorney, Agent, or Firm*—Armstrong, Nikaido, Marmelstein & Kubovcik

[57] ABSTRACT

A contact medium for use in a probe of an ultrasonic flaw detector is made of a macromolecular substance possessing such specific physical constants as a bulk modulus of elasticity in the range of $0.30\times10^{10}$ to $2.00\times10^{10}$ dynes/cm$^2$ and an acoustic impedance in the range of $1.80\times10^5$ to $2.67\times10^5$ g/cm$^2$-sec. The medium can be used at a working temperature range of −20° to 60° C. and in a thickness in the range of 0.5 to 2.0 mm by fixedly attached to the leading end of the probe of the ultrasonic flaw detector with adhesive. The macromolecular substance is, for example, a synthetic rubber piece obtained by admixing ethylenecyclopentadiene as a base with carbon, a vulcanizer, a vulcanization accelerator, an antioxidant, ZnO, stearic acid, and process oil and molding the resulting blend.

1 Claim, 3 Drawing Sheets

CONTACT MEDIUM FOR USE IN PROBE OF ULTRASONIC FLAW DETECTOR

BACKGROUND OF THE INVENTION

This invention relates to a contact medium which is disposed at the leading end of a probe of an ultrasonic flaw detector and interposed as an ultrasonic propagation medium between the probe and an object under test.

In the conventional ultrasonic flaw detector, such wet contact medium as water, oil, or glycerin has been adopted as an ultrasonic propagation medium between the probe and an object under test.

When water is used as the contact medium, the so-called water-immersion testing method is adopted which requires the sensor part of the ultrasonic flaw detector and the object under test to be kept under water or, as disclosed in Japanese Patent Application Laid-open SHO 55(1980)-55,248, the device is utilized which requires a bag of such ultrasonic-pervious film as PVC sheet to be attached to the leading end of the probe and this bag to be filled with water.

When oil or glycerin is used as the contact medium, this contact medium is directly applied on the surface of an object under test.

In any of the cases mentioned above, therefore, there is a possibility that the object under test will be smeared with the wet contact medium or caused to gather rust or yield to corrosion and, at the same time, part of the ultrasonic flaw detector will be deteriorated or damaged by the wet contact medium.

Further, when the object under test happens to possess surface irregularities or sharp corners, there is a possibility that the ultrasonic-pervious film will sustain a rupture and consequently entail leakage of a wet contact medium and, as the result, the operation of the ultrasonic flaw detector will no longer be effectively continued. In the case of such a material as Teflon (tetrafluoroethylene) which is applied on a given surface only with difficulty, there is a disadvantage that the wet contact medium cannot be conveniently interposed between the probe and the object under test.

SUMMARY OF THE INVENTION

This invention has been produced in the light of the true state of affairs of the prior art described above. An object of this invention is to provide a dry contact medium for use in a probe of an ultrasonic flaw detector, which can be easily applied to detect a flaw in an object even possessing surface irregularities or curves without smearing, rusting, corroding, or otherwise damaging either the object under test or the flaw detector.

Another object of this invention is to provide a dry contact medium for use in a probe of an ultrasonic flaw detector, which has a working temperature range of −20° to 60° C.

To accomplish the objects described above according to the present invention, there is provided a dry contact medium for use in a probe of an ultrasonic flaw detector, which is made of a macromolecular substance having the physical constants, i.e. a bulk modulus of elasticity in the range of $0.30\times10^{10}$ to $2.00\times10^{10}$ dynes/cm$^2$ and an acoustic impedance in the range of $1.80\times10^5$ to $2.67\times10^5$ g./cm$^2$-sec.

The contact medium of the present invention has a working temperature range of −20° to 60° C.

The contact medium of the present invention has a thickness in the range of 0.5 to 2.0 mm and is attached fast to the leading end of the probe of the ultrasonic flaw detector with adhesive.

The above and many other advantages, features, and objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE INVENTION

Figure 1:
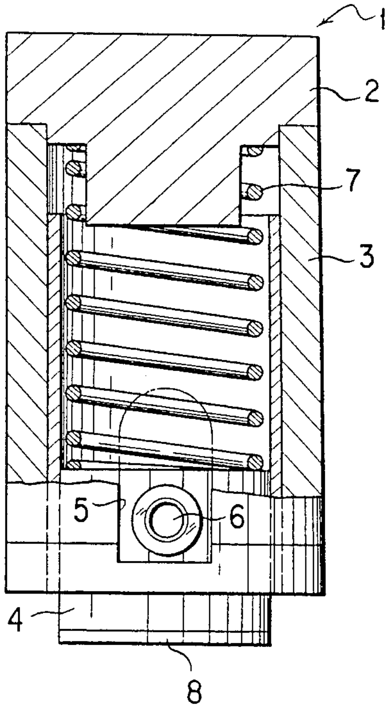
FIG. 1 is a partially sectioned side view of a sensor part of an ultrasonic flaw detector having a contact medium of the present invention attached fast to the leading end of a probe.

FIG. 1 is a partially sectioned side view of a sensor part 1 of an ultrasonic flaw detector having a contact medium of the present invention attached fast to the leading end of a probe. This sensor part is provided with a sensor proper 2 and a probe 4 disposed slidably in the longitudinal direction along a guide part 3 of the detector proper 2. The guide part 3 has an oblong hole 5 bored therein. From the oblong hole 5, a connector 6 of the probe 4 is projected outwardly. The probe 4 is urged by a spring 7 so that the terminal part of the probe 4 will protrude outwardly from the end of the guide part 3.

To the projected terminal face of this probe 4, a contact medium 8 made of a macromolecular substance such as, for example, rubber is attached.

Properly, the contact medium 8 has a thickness in the range of 0.5 to 2.0 mm. The reason for this specific range is that 0.5 mm is the lower limit attainable from the standpoint of fabrication and 2.0 mm is a higher limit beyond which the ultrasonic wave used for the detection of a flaw is multiply echoed possibly to the extent of obstructing the detection of a flaw.

The attachment of the contact medium 8 to the terminal face of the probe 4 is attained by the use of adhesive. As the adhesive, an epoxy type resin or some other suitable adhesive may be used.

The physical constants of the contact medium 8 of the present invention are shown in Table 1 below.

TABLE 1

| Edyn/ cm$^2$ × $10^{10}$ | Kdyn/ cm$^2$ × $10^{10}$ | Gdyn/ cm$^2$ × $10^{10}$ | T° C. | Z g./cm$^2$ sec × $10^5$ |
|---|---|---|---|---|
| 0.7∼14.0 | 0.3∼2.00 | 1.60∼2.80 | −20∼60 | 1.8∼2.67 |

In the table given above, E stands for Young's modulus, K for bulk modulus of elasticity, G for rigidity, T for working temperature, and Z for acoustic impedance.

The physical constants shown in Table 1, except for the temperature, T, were determined on the basis of the results of numerous measurements performed on the following macromolecular materials actually used. The ranges of such physical constants indicated represent dispersions of the results of measurements.

As one typical contact medium embodying the present invention, a synthetic rubber piece obtained by admixing ethylenecyclopentadiene as a base with carbon, vulcanizer, a vulcanization accelerator, an antioxidant, ZnO, stearic acid and process oil and molding the resultant blend was used.

The contact medium 8 perfectly fits the surface of an object under test because the bulk modulus of elasticity, K, thereof is small as indicated in Table 1. Further, since the acoustic impedance, Z, of this contact medium approximates that of water and that of oil ($1.48\times10^5$ g./cm$^2$-sec for water and $1.51\times10^5$ g./cm$^2$-sec for motor oil), this contact medium acquires the same level of detecting sensitivity as the conventional wet contact medium.

The dry contact medium of the present invention is used by pressing it against the object under test as with a human hand. It can be easily and effectively used particularly on objects possessing rough surfaces like casting surfaces or curved surfaces like weld beads.

Moreover, the dry contact medium of this invention is fully serviceable in any desired working frequency range.

Figure 2:
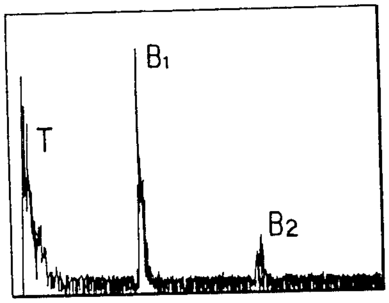
FIG. 2 is a diagram showing a basal waveform obtained during the detection of a flaw in the base of an object under test with an ultrasonic flaw detector furnished with a contact medium of the present invention.
Figure 3:
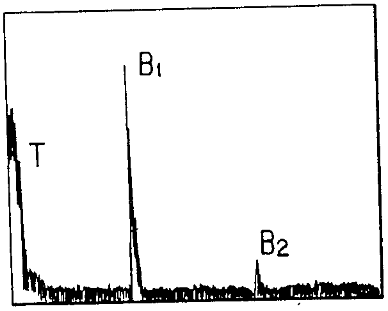
FIG. 3 is a diagram showing a basal waveform obtained during the detection of a flaw in the base of the same object under test as in FIG. 2 with the conventional ultrasonic flaw detector using glycerin as a contact medium.

FIGS. 2 and 3 show basal waveform obtained in an experimental flaw detection conducted on a rectangular object of surface roughness of 0.31 to 0.61 mm respectivley using a dry contact medium (the aforementioned synthetic rubber piece) of this invention and a conventional wet contact medium (glycerin). The basal waveform shown in FIG. 2 was obtained by the use of the dry contact medium of this invention and that shown in FIG. 3 was obtained by the use of glycerin.

In accordance with this invention, the pressure with which the probe 4 having the dry contact medium 8 attached to the leading end thereof is pressed against the object under test is equal to normal finger pressure, namely about 1.2 to 1.5 kg. The test apparatus 11 illustrated in FIG. 4, therefore, is adapted to exert a load of an equivalent magnitude.

Figure 4:
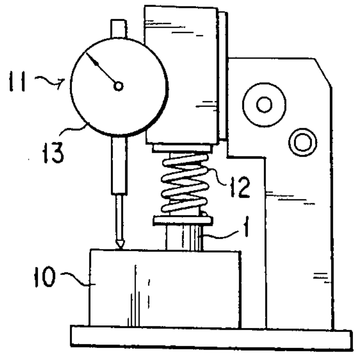
FIG. 4 is a front view of an apparatus used in the experimental ultrasonic flaw detection the results of which are shown in FIGS. 2 and 3.

In FIG. 4, the reference numerals 12 and 13 respectively denote a spring and a dial gauge.

The physical properties of the contact medium 8 made of the aforementioned synthetic rubber and used in the experimental ultrasonic flaw detection are as follows.

| | |
|---|---|
| Young's modulus (E) | $4.0\times10^{10}$ dynes/cm$^2$ |
| Bulk modulus of elasticity (K) | $1.2\times10^{10}$ dynes/cm$^2$ |
| Rigidity (G) | $2.0\times10^{10}$ dynes/cm$^2$ |
| Acoustic impedance (Z) | $2.4\times10^5$ g./cm$^2$-sec |
| Working temperature range (T) | −20° to 60° C. |
| Thickness | 1.0 mm |

In the two basal waveforms illustrated in FIGS. 2 and 3, T stands for a transmission wave and $B_1$ and $B_2$ stands for an echo reflected on the base of an object 10 under test.

As clearly noted from FIGS. 2 and 3, the two basal waveforms closely resemble each other, The experiment, therefore, has demonstrated that the dry contact medium 8 of this invention made of a macromolecular substance acquires the same degree of detection sensitivity as the conventional wet contact medium such as glycerin.

What is claimed is:

1. A sensor for an ultrasonic flaw detector comprising, an ultrasonic probe having a leading end, a contact medium attached to the leading end by an adhesive and adapted to contact a surface of an object to be tested, wherein said contact medium has a bulk modulus of elasticity in the range of $0.30\times10^{10}$ to $2.00\times10^{10}$ dynes/cm$^2$, has an acoustic impedance in the range of $1.80\times10^5$ to $2.67\times10^5$ g./cm$^2$-sec, is adapted to operate in a temperature range of −20° C. to 60° C., has a thickness in the range of 0.5 to 2.0 mm, and comprises a molded admixture of ethylene-cyclopentadiene, carbon, a vulcanizer, a vulcanization accelerator, an antioxidant, ZnO, stearic acid and process oil.

* * * * *